April 8, 1930.  L. H. KAUPKE  1,753,520
SEED PLANTER
Filed Jan. 19, 1922  2 Sheets-Sheet 1

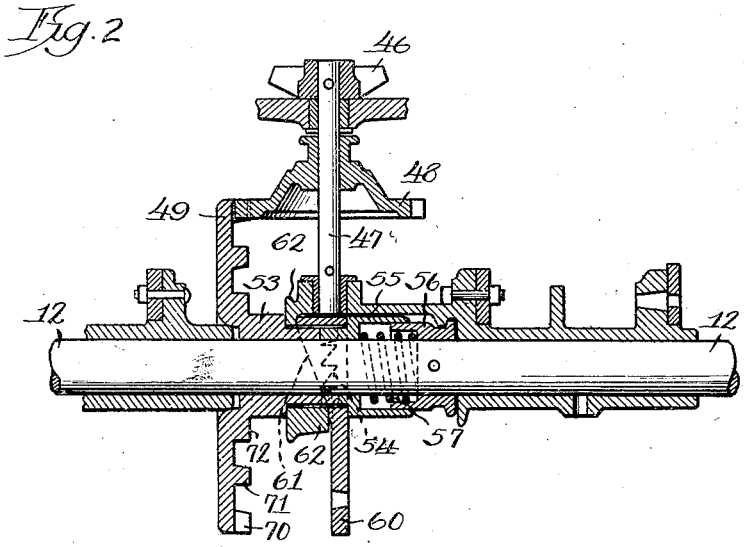
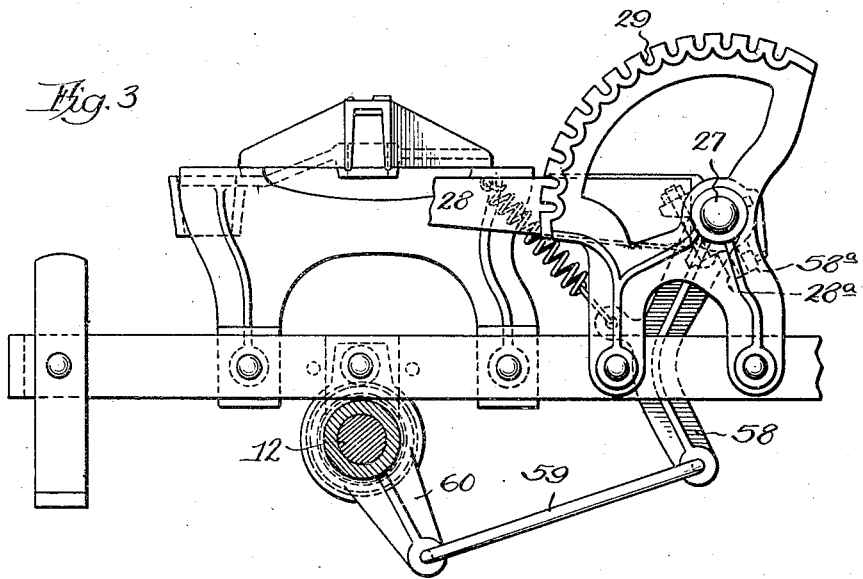

Patented Apr. 8, 1930

1,753,520

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

SEED PLANTER

Original application filed July 19, 1920, Serial No. 397,166. Divided and this application filed January 19, 1922. Serial No. 530,247.

This application is a division of my prior application Serial No. 397,166, for an improvement in Cotton planters, filed July 19, 1920. The apparatus herein described and claimed is adapted for use in planters for cotton and other seeds, and comprises simplified means for changing the speed of the seed plate and thereby changing the rate of delivery of seed by simply shifting the position of a gear and without interrupting the operation of the apparatus.

These and other features of my invention are illustrated in the drawings and described below.

In the drawings—

Fig. 2 is a sectional view through the clutch and gear shift mechanism.

Fig. 3 is a detail view in elevation showing the operating connection for the clutch mechanism which controls the operation of the seed-delivery apparatus.

Figure 1:
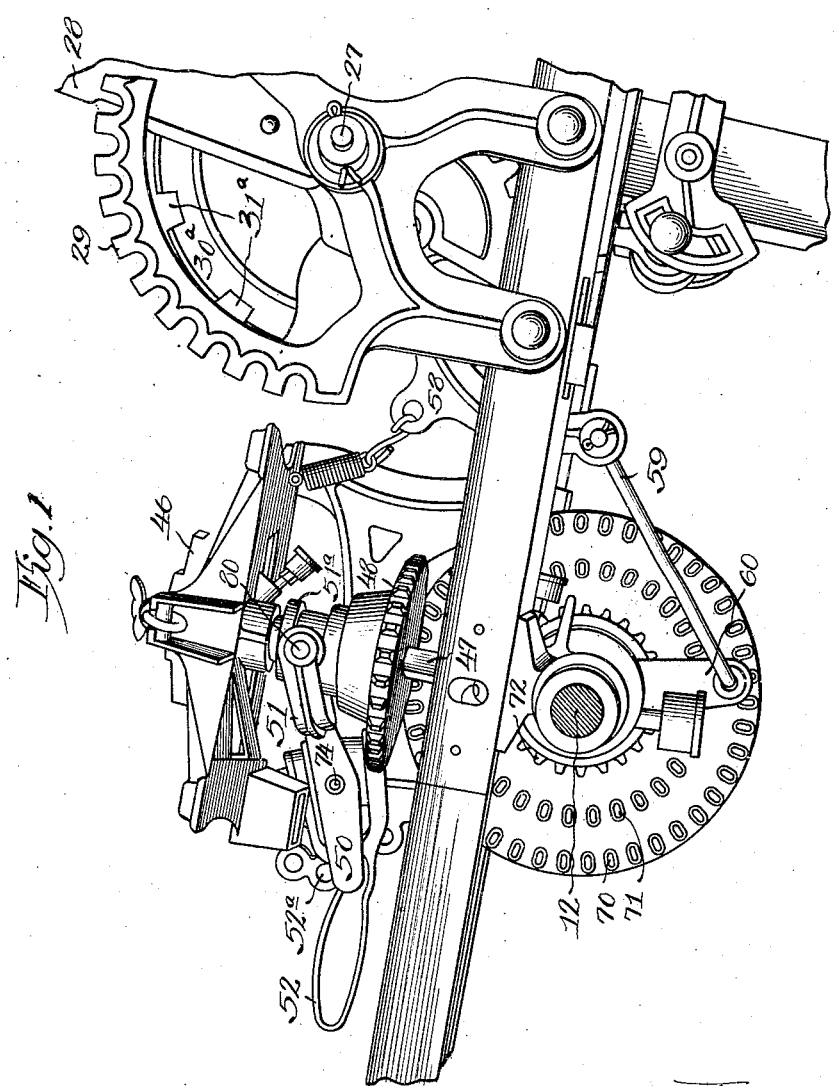
Fig. 1 is a detail view in perspective of the gear shift and clutch mechanism.

As shown in Figure 1, the apparatus is mounted on the axle 12 from which the seed-delivery mechanism is driven. I have not in this application shown in detail the mechanism for delivering the seed from the seed-can, as that mechanism forms the subject-matter of my co-pending application of which this is a division. Of the seed delivery mechanism I have shown in detail only the drive member 46 connected to the seed-plate. This clutch member 46 is mounted upon a stud-shaft 47 which is rotatably mounted upon the frame of the machine. I have not herein shown in detail the co-acting clutch member upon the seed-plate, that being no part of and not being necessary to an understanding of the invention claimed herein. Rotation is imparted to the stud shaft 47 by means of a gear 48 which is slidably and non-rotatably mounted upon the stud shaft, the gear 48 being provided with a square opening fitting the stud shaft 47 which is also square. Any arrangement permitting the gear 48 to slide endwise on the shaft 47 but preventing relative rotation of the gear and stud shaft would serve the purpose.

The gear 48 is driven by its engagement with the gear wheel 49. The gear wheel 49 is loosely mounted on the axle 12, and by means of a clutch, hereinafter described, may be adjusted either to rotate freely relative to said shaft or may be fixed thereto for the purpose of deriving power from the shaft. The gear member 49 is provided with a plurality of sets of gear teeth designated respectively 70, 71 and 72. As will clearly appear from Figs. 1 and 2, the speed of rotation of the clutch member 46 and of the seed plate may be varied by sliding the gear 48 upon the shaft 47 into engagement with any selected one of the sets of teeth 70, 71 and 72. For the purpose of making this adjustment, I provide a shift-lever 50 pivotally mounted at 74 on the frame of the machine. The shift lever 50 is provided with a yoke 51 carrying trunnions 80 which engage a groove in the collar 51ª formed integrally with the gear 48. This lever 50 can be held in a plurality of adjustable positions through the medium of a suitable spring catch controlled by the handle 52, which catch is adapted to engage with any one of a plurality of holes in a segment 52ª.

The disk gear 49 is mounted upon a sleeve 53, shown in the drawing as formed integrally with the gear. The sleeve 53 is loosely mounted upon the axle 12 and is provided at one end with a series of clutch teeth 54 which engage with corresponding teeth in a sliding clutch member 55. The sliding member 55 is keyed to a collar 56 which is pinned to the axle and rotates therewith. A spring 57 operates to normally hold the clutch member 55 in engagement with the clutch teeth 54 of the sleeve 53, and thus transmits power from the axle to the disk gear 49. Loosely mounted on the cross shaft 27, by the rotation of which the furrow-opener (not shown) is raised and lowered, is an arm 58 connected at its lower end by a link 59 with an arm 60 journaled upon the sleeve 53. The upper circular bearing end of this arm 60 is provided with a cam face 61 which engages with a corresponding cam face on the stationary bearing 62. The arm 58 is formed with a shoulder 58ª, shown in Fig. 3, lying in the path of movement of a co-acting shoulder 28ª, formed on the lever 28. The relative position of these shoulders is such that as the lever 28 approaches its lowermost position, corresponding to the elevated position of the furrow-opener, the shoulder 28ª contacts with the shoulder 58ª and imparts a rotary movement to the arm 58. With this construction, when the hand-lever 28 is operated to raise the furrow-opener out of the ground, the arm 60 is rotated, and, through the medium of its cam-faced engagement with the bearing 62, it is forced laterally against the clutch member 55, thus forcing this clutch member out of engagement with the clutch teeth 54 and discontinuing the operation of the disk gear 49. By this means the raising of the furrow-opener acts automatically to disengage the disk gear 49 from the shaft 12.

The openings in the segment 52ª, with which the spring-catch on the handle 52 cooperates to hold the gear 48 in mesh with the selected set of gears on the disk gear 49, are so spaced as to secure proper meshing in each of the three adjusted positions. The use of a clutch for rendering the seed-delivery mechanism inactive when the furrow-opener is elevated renders it possible to dispense with any mechanism or movement for disengaging the gears, and with the form of disk gear illustrated the necessary changes of speed ratio are likewise effected by the single sliding movement of the gear 48 upon the shaft 47.

What I claim as my invention is:

In a device of the class described, a frame, an axle, a disk gear loosely mounted on said axle and having a plurality of sets of radially spaced concentric gear teeth fixed thereon, a stud shaft having bearing on said frame in fixed parallel relation with said disk gear, a driven gear slidably and non-rotatably mounted on said stud shaft, said driven gear having spur gear teeth adapted to have selective engagement with said sets of concentric gear teeth on the disk gear, sliding clutch means on said axle affording driving engagement between said axle and said disk gear, cam means concentric with said axle and abutting said stud shaft bearing for operating said clutch means, and means independent of said last named clutch means for shifting said driven gear.

Signed by me at Rock Island, Illinois, this 14th day of January, 1922.

LEE H. KAUPKE.